United States Patent [19]
Rheault

[11] Patent Number: 6,024,050
[45] Date of Patent: Feb. 15, 2000

[54] SHELLFISH AQUACULTURE UPWELLERS AND SYSTEMS

[76] Inventor: Robert B. Rheault, 1121 Mooresfield Rd., Wakefield, R.I. 02879

[21] Appl. No.: 09/098,788

[22] Filed: Jun. 17, 1998

[51] Int. Cl.[7] .................................................. A01K 61/00
[52] U.S. Cl. ..................... 119/238; 119/239; 119/241; 119/236
[58] Field of Search .................... 119/241, 239, 119/240, 238, 236, 234, 208, 223, 242, 243, 244, 205, 204, 207, 209

[56] References Cited

U.S. PATENT DOCUMENTS

| | | | |
|---|---|---|---|
| 3,517,648 | 6/1970 | Budge | 119/236 |
| 3,766,888 | 10/1973 | Wiegardt, Jr. | 119/240 |
| 3,996,894 | 12/1976 | Wiegardt, Jr. . | |
| 3,996,895 | 12/1976 | Wiegardt, Jr. . | |
| 4,320,717 | 3/1982 | Rowley | 119/241 |
| 4,328,764 | 5/1982 | Nickel . | |
| 4,344,384 | 8/1982 | Rowley | 119/241 |
| 4,395,970 | 8/1983 | Kunkle et al. | 119/240 |
| 4,434,743 | 3/1984 | Nickel . | |
| 4,438,725 | 3/1984 | O'Sullivan et al. | 119/238 |
| 4,621,588 | 11/1986 | Harris . | |
| 4,860,690 | 8/1989 | De Santo et al. . | |
| 5,269,254 | 12/1993 | Gagliano et al. | 119/237 |
| 5,400,745 | 3/1995 | Saxby et al. . | |
| 5,438,958 | 8/1995 | Ericsson et al. . | |
| 5,660,141 | 8/1997 | Kjersem et al. | 119/223 |
| 5,692,455 | 12/1997 | Wang | 119/242 |

*Primary Examiner*—Michael J. Carone
*Assistant Examiner*—James S. Bergin
*Attorney, Agent, or Firm*—Alix, Yale & Ristas, LLP

[57] ABSTRACT

A shellfish aquaculture upweller system utilizes one or more upwellers having a volume-defining silo, a selectively removable exhaust port and a selectively removable and liquid permeable assembly. The silo includes a top end, an apertured bottom end and an apertured side wall. The exhaust port can be affixed to the silo and, when affixed thereto, provides controlled fluid communication between the liquid ambient environment and the volume defined by the silo. The liquid permeable assembly covers the bottom aperture when the assembly is mounted to the silo to permit liquid to pass therethrough while retaining the shellfish seed in the silo volume when the upweller is in use. The assemblies can be interchanged as desired and a plurality of the upwellers can be stored and transported in a compact manner due to the shape of the upweller silos.

18 Claims, 7 Drawing Sheets

SHELLFISH AQUACULTURE UPWELLERS AND SYSTEMS

BACKGROUND OF THE INVENTION

1. Field of the Invention

The present invention generally relates to the field of shellfish aquaculture. More specifically, the invention is directed to improved upwellers and upweller systems for raising shellfish seed. Accordingly, the general objects of the present invention are to provide novel and improved methods and apparatus of such character.

2. Description of the Related Art

Shellfish aquaculture is a rapidly growing field that is increasingly dependent on hatchery-reared shellfish seed. Although hatchery production is relatively straight-forward, small shellfish seed from the hatchery (1 to 3 mm) are delicate and need to be protected from predators until they are strong enough to resist attacks by, for example, crabs. Shellfish seed which are at least 10 to 20 mm are often considered hearty enough to withstand attack from such predators. Therefore, shellfish seed received from a hatchery must undergo an additional protective rearing stage prior to their introduction into a natural habitat. Nearly all of the shellfish seed in this stage of growth (the nursery phase) are reared in upwellers (mostly land-based, but several floating upweller designs have been tried). This nursery phase of shellfish aquaculture (1 to 20 mm) typically occurs in just three to four months of growth and, for a number of reasons, is the most challenging part of growing shellfish.

Most upwellers for shellfish in the nursery phase employ a screen-bottomed container to hold the shellfish seed while water is pumped up through the shellfish bed to bring new water and food to the shellfish. Additionally, this water circulation also serves the purpose of carrying away any waste that may be generated by the shellfish seed.

As the shellfish aquaculture industry has evolved, several designs for upwellers have been developed and tested. These include land-based systems, wherein water is pumped through tanks in which upweller silos are disposed. They also include floating upweller systems, wherein the upweller is partially disposed within an outdoor body of water and the water is either circulated therethrough by harnessing natural currents (tidal-powered floating upwellers) or with the assistance of pumps. However, most of the upwellers currently in use represent small variations from well known upweller designs, are often crude and, invariably, more expensive than necessary.

In recent years, a number of more innovative aquaculture systems have been developed. Two examples of such systems include U.S. Pat. No. 5,438,958 to Ericsson et al., issued Aug. 8, 1995 and U.S. Pat. No. 4,860,690 to De Santo et al., issued Aug. 29, 1989. The disclosures of the Ericsson et al. and De Santo et al. U.S. patents are hereby incorporated by reference. In particular, the shellfish aquaculture system of De Santo et al. represents a significant advance over the prior art in that the invention includes a marina dock which has been modified to incorporate a shellfish aquaculture system which remains unobtrusively contained under the dock. The primary advantage of the De Santo et al. system lies in its dual-use nature, i.e., the docks can be used as usual while the components of the aquaculture system remain accessible for the seeding, maintenance, harvesting and other conventional aquaculture activities.

One significant drawback of the aquaculture system disclosed in De Santo et al. resides in its utilization of tidal-powered baskets (in lieu of upwellers) to rear the shellfish. Such baskets allow the waters in and around the marine dock to flow about the shellfish seed being grown but the flow rate of the water circulating therethrough is necessarily limited by the natural conditions of the ambient environment. This natural flow rate is typically far too inadequate to permit rapid growth in high concentrations of shellfish seed during the nursery phase. Thus, De Santo et al.'s aquaculture system is prone to either low concentrations of shellfish seed or to stunted shellfish growth.

One way to alleviate the deficiencies in the De Santo aquaculture system is to use aquaculture upwellers in lieu of De Santo's baskets. Upwellers typically consist of a silo formed from a hollow cylindrical piece of PVC pipe and a screen assembly permanently affixed (typically glued) to one end of the silo. In the case of floating upwellers, the upweller is partially suspended within a liquid ambient environment such that the screened end of the silo is disposed well below the surface of the liquid. Additionally, the opposite end of the silo extends well above the surface of the liquid and an exit port in the upweller permits water (and the nutrients disposed therein) to be pumped therethrough at an accelerated rate. A high concentration of shellfish seed may, thus, be placed into an upweller without stunting shellfish growth. Accordingly, the use of upwellers in an aquaculture system such as that taught by De Santo et al. has the potential of further advancing the shellfish aquaculture art.

Unfortunately, still other deficiencies associated with the use of upwellers have prevented the development of a truly advanced shellfish aquaculture system. For example, economies of scale dictate that shellfish aquaculture be conducted on as large a scale as possible to maximize the profitability of the undertaking. However, since conventional upwellers utilize hollow-cylindrical silos, transport and storage of such upwellers is a difficult and costly endeavor. Moreover, because the screen assemblies attached to the upweller silos are permanently affixed thereto, repairing damaged upwellers is a difficult and time consuming process.

Still another deficiency associated with upwellers of the nature discussed above is that a shellfish grower must stock far more upwellers than can be actually used at any given time. Shellfish seed growth is maximized when fluid flow through an upweller is maximized. Conventionally, very young seed are first raised in upwellers having relatively fine screens to permit some fluid passage therethrough while preventing the seed from falling through the pores in the screen assembly. As the shellfish seed grow, however, the seed must be transferred into upwellers having coarser screen assemblies to enhance the fluid flow through the upweller. Thus, throughout the nursery phase of the shellfish life cycle, three or more sets of upwellers could be employed to retain the growing shellfish seed. The shellfish upwellers which are not being utilized at any given time must be stored by the shellfish grower. Naturally, the relatively large space required to do so increases costs associated with the aquaculture endeavor and prevents the attainment of large economies of scale.

SUMMARY OF THE INVENTION

It is, accordingly, an object of the present invention to provide a shellfish aquaculture upweller which can be effectively utilized over the full length of the nursery phase of the shellfish seed life cycle.

It is another object of the present invention to provide a shellfish aquaculture upweller for growing shellfish seed wherein the upweller can be more efficiently transported and stored due to its ability to be nested together with other upwellers.
}

It is a further object of the present invention to provide a shellfish aquaculture upweller system for growing shellfish seed which utilizes a plurality of upwellers that are capable of receiving differently sized and interchangeable screen assemblies and, when utilized with one another as a system having interchangeable components, which is capable of minimizing upweller transport and storage costs.

These and other objects and advantages of the present invention are provided in one embodiment by providing a shellfish aquaculture upweller having a volume-defining silo, a selectively removable exhaust port and a selectively removable and liquid permeable assembly. The silo includes a top end, an apertured bottom end and an apertured side wall. The exhaust port can be affixed to the silo and, when affixed thereto, provides controlled fluid communication between the liquid ambient environment and the volume defined by the silo. The assembly covers the bottom aperture when the assembly is mounted to the silo. In this manner, the assembly permits liquid to pass therethrough while retaining the shellfish seed in the silo volume when the upweller is in use. In an alternative embodiment, the exhaust port can be disposed of so that fluid flow through the upweller is directly through the assembly and out the side wall aperture.

While the silo can have any one of a plurality of cross-sectional shapes (such as rectangular, circular or generally square) it is preferred that the silo decrease in cross-section from one end of the silo toward the opposite end. An alternative embodiment of the present invention utilizes a two-piece hexagonal silo with parallel walls, the silo being capable of being disassembled into two components which permit nesting with the disassembled components of other silos.

The liquid permeable assembly can assume any one of a large number of configurations. For example, the assembly can comprise a liquid-passing member (preferably, but not necessarily a screen), a rigid rim surrounding the liquid-passing member and at least one fastener detachably affixing the rim of the screen assembly to the bottom end of the silo. While a large number of removable fasteners known to those of ordinary skill could be utilized to affix the screen assembly to the silo, the preferred fasteners are a screw, bolt or pop rivet. Alternatively, a number of other ways to detachably affix the screen assembly to the silo will be readily apparent to those of skill in the art.

To properly position and support the exhaust port within the silo, the silo could include a port-support which is located generally opposite to the sidewall aperture so that the port may extend through the sidewall aperture and mate with the port-support on the sidewall. The exhaust port improves the structural integrity of the upweller and permits fluid communication between the volume within the silo and the liquid ambient environment. Such fluid communication is preferably accomplished through the use of a plurality of apertures disposed along the intermediate length of the port so that the apertures are disposed within the silo volume when the exhaust port is installed in the silo. An exit port at the far end of the exhaust port completes the fluid path to the ambient environment.

Upwellers in accordance with the present invention can be combined to form an aquaculture upweller system which overcomes the deficiencies of conventional upwellers. For example, the inventive upwellers are preferably tapered to permit nesting of the upwellers during transport and/or storage. Additionally, the total number of upwellers which a shellfish grower must stock is drastically reduced due to the interchangeability of the upweller screen assemblies. Thus, utilizing the present invention, only a relatively small number of inventive upweller silos, each having a plurality of interchangeable screen assemblies, can replace a large number of conventional silos.

The inventive upwellers and aquaculture systems described herein are particularly well-suited to an aquaculture system of the general nature taught by De Santo et al. (i.e., a dual-use dock system deployed in a marina) wherein De Santo et al.'s baskets are replaced with the inventive upwellers described herein. Additionally, the inventive upwellers can be suitably arranged in such a system so that a centralized pump draws a continuous flow of liquid (up to 100 gallons per minute) through a plurality of upwellers simultaneously. Nonetheless, the inventive upwellers and aquaculture systems described herein can be employed in both land-based and floating upweller systems regardless of power source and irrespective of whether the upweller silo is held under a dock, next to one, or out in open water.

BRIEF DESCRIPTION OF THE DRAWINGS

The preferred embodiments of the present invention will be described below with reference to the accompanying drawings wherein like reference numerals represent like structures and wherein.

DESCRIPTION OF THE PREFERRED EMBODIMENTS

Figure 1:
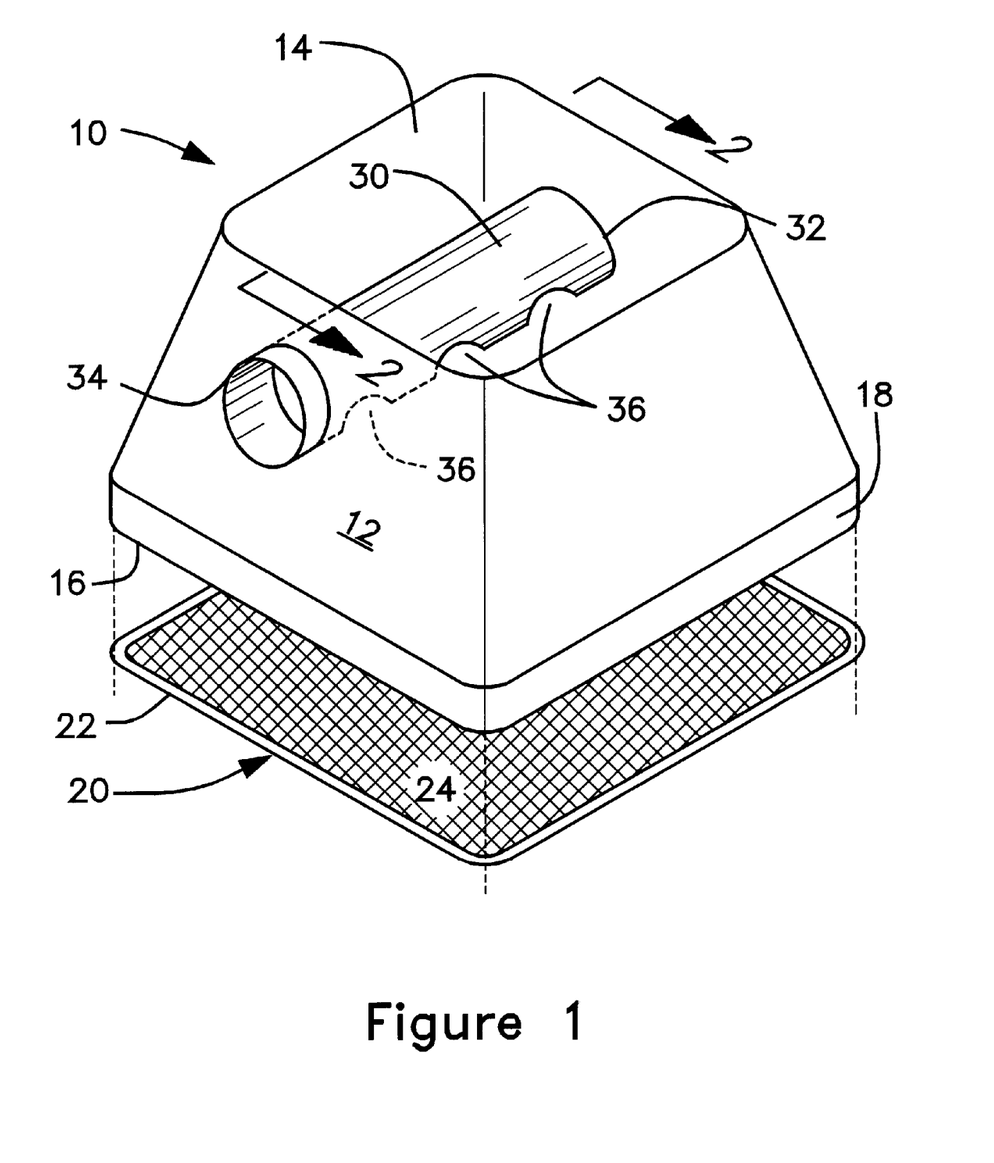
FIG. 1 is a partially exploded view of an upweller in accordance with a first preferred embodiment of the present invention.
Figure 2:
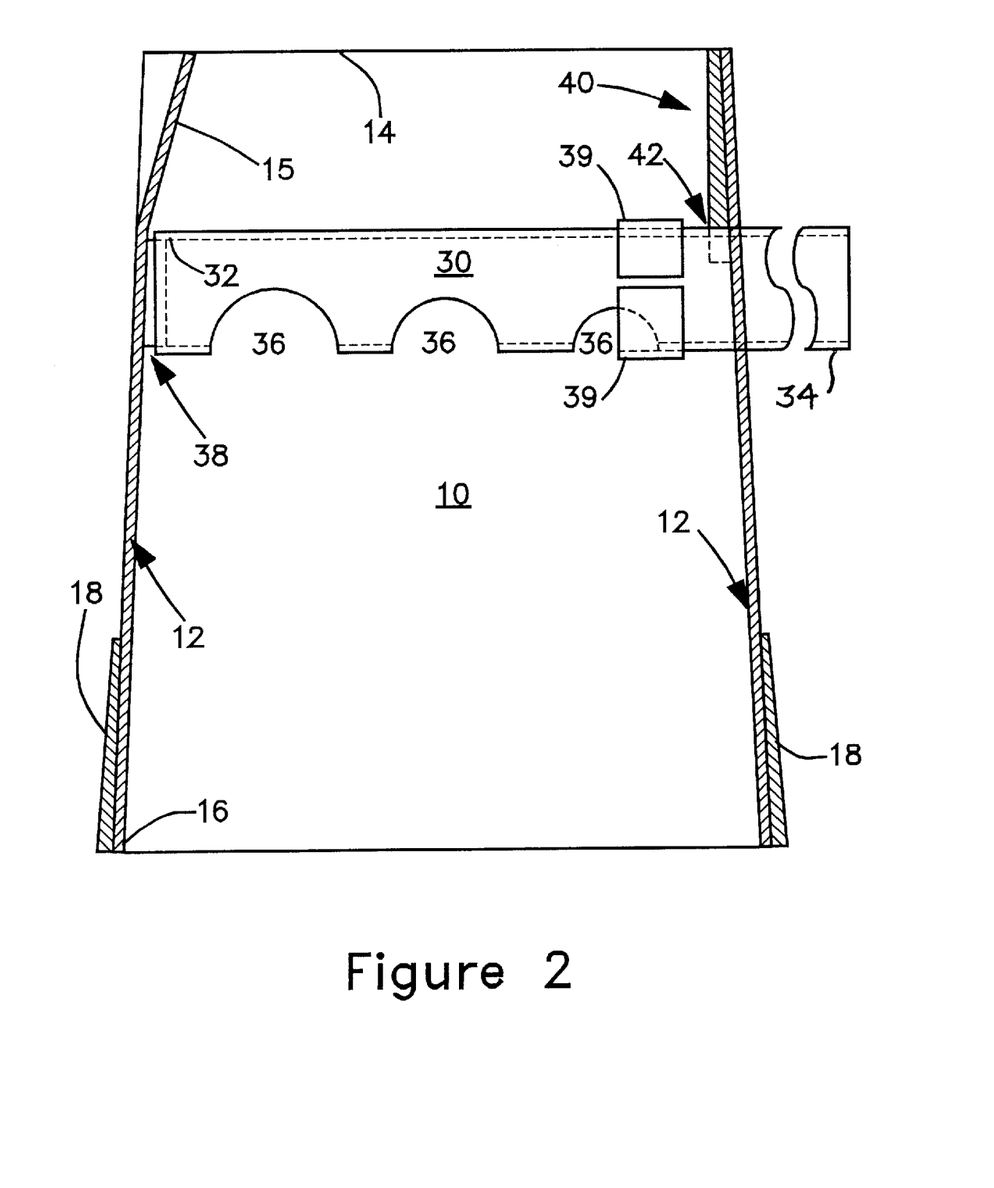
FIG. 2 is a cross-sectional side-elevation view of the upweller of FIG. 1 taken along line 2—2.
Figure 4:
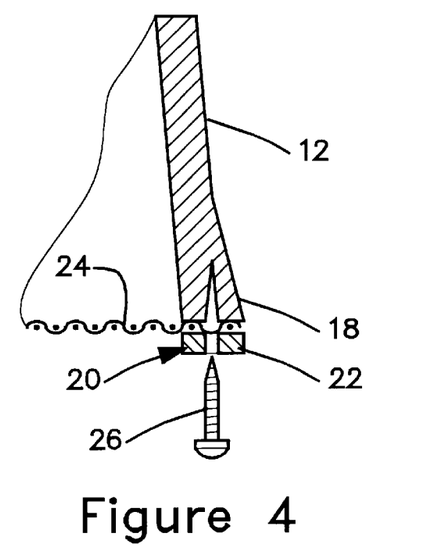
FIG. 4 is a partial view of an upweller in accordance with the present invention illustrating one way to detachably affix an inventive liquid permeable assembly to an inventive silo.

With joint reference to FIGS. 1, 2 and 4 there is shown a shellfish aquaculture upweller 10 in accordance with one preferred embodiment of the present invention. The upweller 10 has a silo 12, a screen assembly 20 and an exhaust port 30. The silo 12 is preferably an integral unit which includes four side walls arranged to define a volume which is generally square in cross-section. Alternatively, silo-defined volumes of other cross-sections such as circular or rectangular could also be defined within silo 12. Silo 12 preferably includes a top end 14 and a bottom end 16 which defines a reinforcing silo-lip 18 for receiving screen assembly 20. As best seen in FIG. 2, silo 12 preferably decreases in cross-section from bottom end 16 toward top end 14. A total decrease in width of between about two to six inches over the height (about 24 inches) of upweller 10 is preferred. This represents about a ten degree taper. As shown in FIG. 1, this decrease in cross-section is exaggerated for purposes of illustration.

Silo 12 preferably has a port-support member 38 disposed on the interior of silo 12 just below an indented region 15. Also as best seen in FIG. 2, port-support member 38 is preferably disposed opposite side wall aperture 42 so that exhaust port 30 can extend through silo aperture 42 and be supported at an opposite end thereof at port-support 38. In this manner, exhaust port 30 can serve as a handle for placing upweller 10 into, and removing upweller 10 from, a body of water during normal maintenance. Affixing exhaust port 30 to silo 12 in this manner also provides the advantage of improving the structural integrity of upweller 10. As compared with conventional upwellers, which typically use a short pipe terminating near the center of the upweller, the present invention does not have a weak spot which is subject to stresses and breakage.

With primary reference now to FIGS. 1 and 4, upweller 10 also includes screen assembly 20 which is detachably affixed to silo 12 at bottom end 16 of silo 12. Screen assembly 20 preferably includes a liquid-permeable member 24 which is surrounded about the perimeter thereof by rim 22. While liquid-permeable member 24 is preferably a screen, a wide variety of other materials having a relatively uniform liquid-passage pores therethrough could also be utilized. Rim 22 is preferably a rigid or semi-rigid member to which liquid-permeable member 24 is affixed, rim 22 being sufficiently rigid, when affixed to silo 12, to keep member 24 taut even under the weight of the shellfish seed. Screen assembly 20 is preferably detachably affixed to lip 18 of bottom end 16 with a plurality of removable fasteners. As shown in FIG. 4, lip 18 can comprise a large region for receiving upwardly directed removable fasteners 26.

Figure 5:
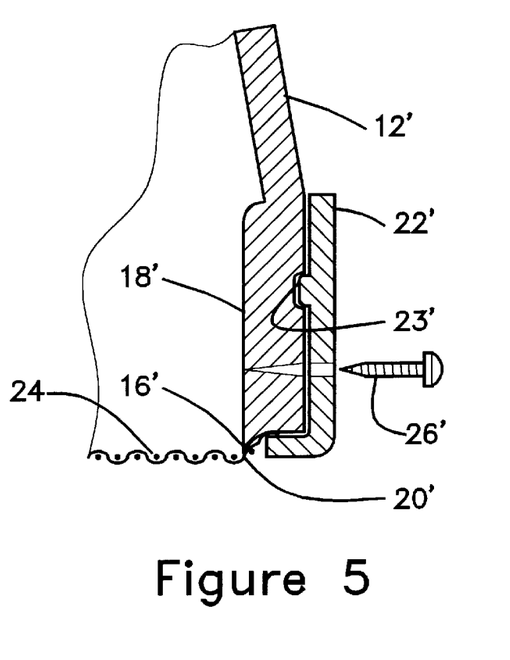
FIG. 5 is a partial view of an upweller in accordance with the present invention illustrating another way to detachably affix an inventive assembly to an inventive silo.

Alternatively, as shown in FIG. 5, lip 18 could comprise an inwardly enlarged region 18' which receives inwardly directed fasteners 26' through the side of bottom 16'. Also as shown in FIG. 5, screen assembly 20' can include an alternatively-shaped rim 22' which wraps around the outside of silo 12' for engagement therewith. To assist with affixation of screen assembly 20' to silo 12', cooperating components of screen assembly 20' and silo 12' can assist with affixation of screen assembly 20' to silo 12'. It is further contemplated that cooperating members 23' could be the sole means for fastening screen assembly 20' to silo 12'. In this event, removable fastener 26' would, obviously, not be utilized.

With primary reference to FIGS. 1 and 2, it will be appreciated that upweller 10 preferably further includes exhaust port 30 which is installed at least partially within silo 12 when upweller 10 is fully assembled. Port 30 is preferably a generally hollow-cylindrical PVC pipe about four inches in diameter and having a first end 32 which receives port-support 38 when port 30 is received within silo 12. An opposite exit end 34 preferably extends through silo aperture 42. Port 30 further preferably comprises entry port apertures 36 along the intermediate length thereof to permit controlled fluid communication between the interior and the exterior of silo 12 via exhaust port 30. Since screen assembly 20 further includes liquid-permeable member 24, upweller 10 permits the free-flow of liquid through the bottom end 16 of silo 12, through entry apertures 36 of port 30, and finally, out exit end 34 of exhaust port 30. Circulation of liquid in this manner ensures that high concentrations of shellfish seed residing within silo 12 receive sufficient food and nutrients to permit rapid and robust growth and that waste material generated by the shellfish seed is transported out of silo 12.

The size, number and location of apertures 36 determine the particular volume and pattern of liquid flow through upweller 10, thus ensuring maximum flow rate and distribution through silo 12. Apertures 36 are preferably graduated in size such that the largest aperture is furthest from exit end 34 (see FIG. 2) to ensure uniform flow through silo 12. Otherwise, the apertures nearest end 34 will experience disproportionately high flow relative to the apertures nearest port support 38. Moreover, a user can selectively occlude (either partially or completely) one or more of apertures 36 by sliding and/or rotating a band 39 to thereby fine tune flow distribution within silo 12. As shown, band 39 is preferably an interrupted ring of PVC material sized to friction fit onto port 30. Those of ordinary skill will readily appreciate many alternative methods and apparatus for varying the size of apertures 36, all of which are mere variations of the preferred methods and apparatus noted above. Naturally, exhaust port 30 can be removed from silo 12 to permit nested transport and storage of upweller 10 in a most efficient and cost-effective manner. Similarly, screen assembly 20 can be easily removed from silo 12 and the present invention permits the use of a single silo with a plurality of screen assemblies 24 individually and selectively installed thereon.

Figure 3:
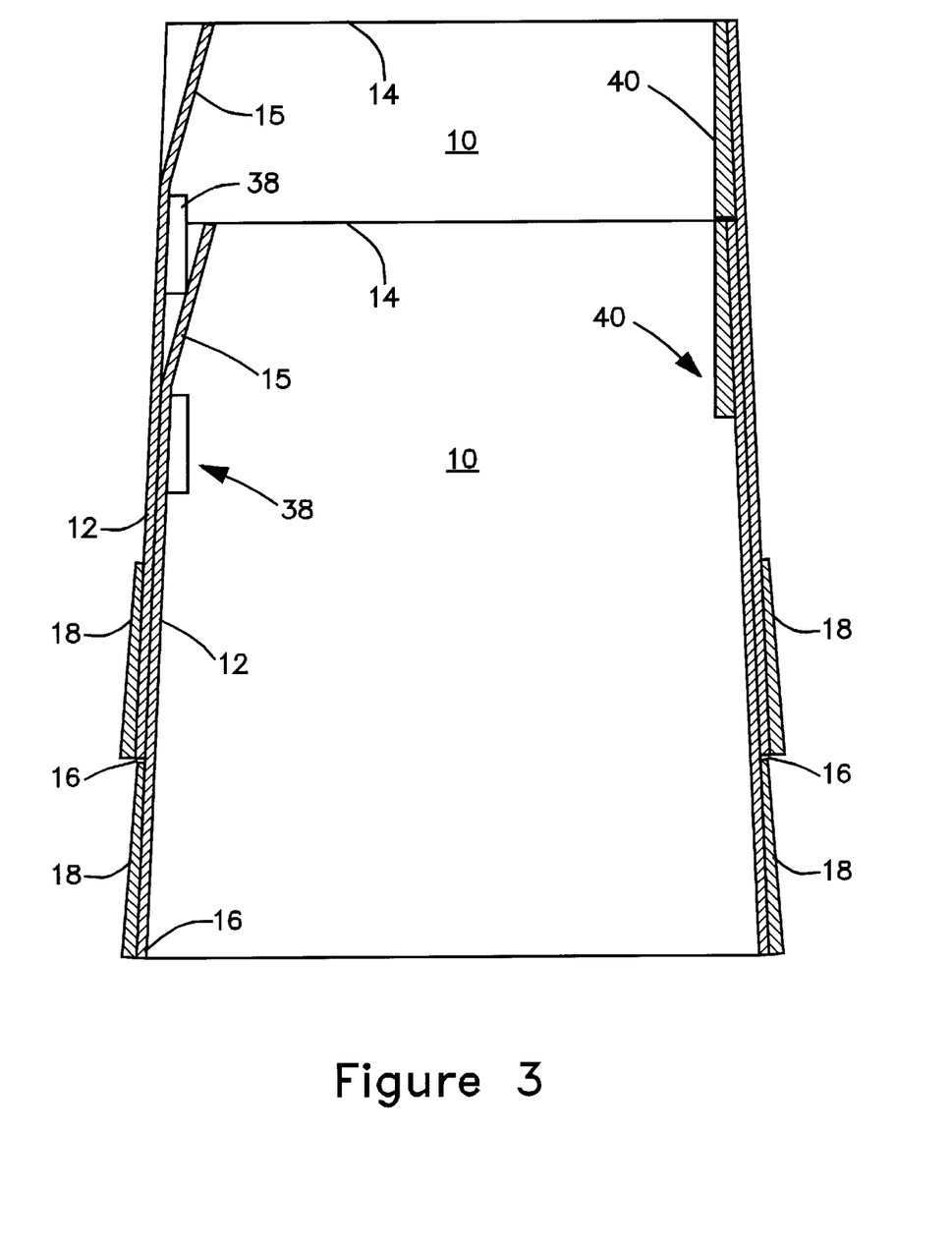
FIG. 3 is a cross-sectional side-elevation view of two upwellers in accordance with the first preferred embodiment of the present invention, the upwellers being nested together.

It will be appreciated that a shellfish aquaculture system utilizing the present invention will employ a plurality of upwellers such as upweller 10. These upwellers can be nested within one another as shown in FIG. 3 and a plurality of detachable screen assemblies 20 can be selectively and individually affixed thereto as desired. The plurality of screen assemblies 20 preferably only differ from one another in the size of the pores of the liquid-permeable material 24. Accordingly, a user may prepare an upweller 10 for use with a particular size shellfish seed by removing the screen assembly affixed to a particular silo and replacing the removed screen assembly with one having differently sized liquid-passage pores. In this manner, a single upweller silo can be modified to ensure maximum fluid flow and, hence, maximum shellfish seed growth throughout the entire nursery phase of the shellfish. This is achieved by interchanging screen assemblies 20 as necessary to ensure that liquid-passage pores of screen assembly 20 are always only generally slightly smaller than the size of the shellfish seeds themselves.

With reference now to FIG. 3, there is shown a pair of shellfish upwellers 10 nested within one another. As shown therein, the various components of each upweller 10 (for example, lower lip 18, port-support 38, indented region 15 and a reinforcing member 40) are appropriately located to ensure compact nesting between upwellers 10. It will be readily appreciated that additional silos can be nested together as desired during transport and/or storage. Naturally, before upwellers are nested as shown in FIG. 3, screen assemblies 20 and exhaust ports 30 should be removed from upwellers 10 and stored separately. In an alternate embodiment, reinforced lower lip 18, which in part acts as a nesting stop, can be replaced with nesting tabs extending outwardly from silo 12.

Figure 6:
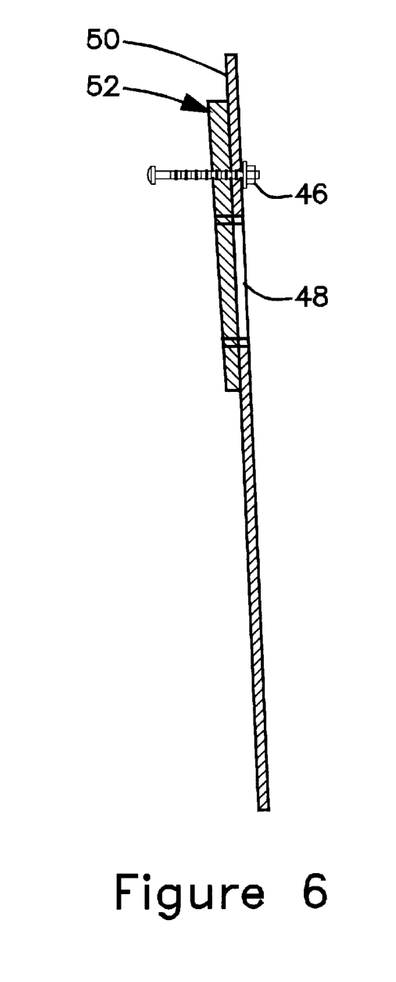
FIG. 6 is a cross-sectional side-elevation view of a mounting bracket which can be utilized to affix an inventive upweller to a vertical surface.

Turning now to FIG. 6, there is shown a mounting bracket 52 which can be utilized to affix an inventive upweller, such as upweller 10, to a vertical surface 50. Bracket 52 essentially consists of an apertured wedge member designed to cooperate with angled or indented wall 15 of silo 12 to permit exit end 34 of exhaust port 30 to extend through aperture 48 of vertical wall 50. Upweller 10 is preferably affixed to bracket 52 and vertical wall 50 with a fastener 46 which extends through reinforcing member 40, bracket 52 and vertical wall 50.

Figure 7:
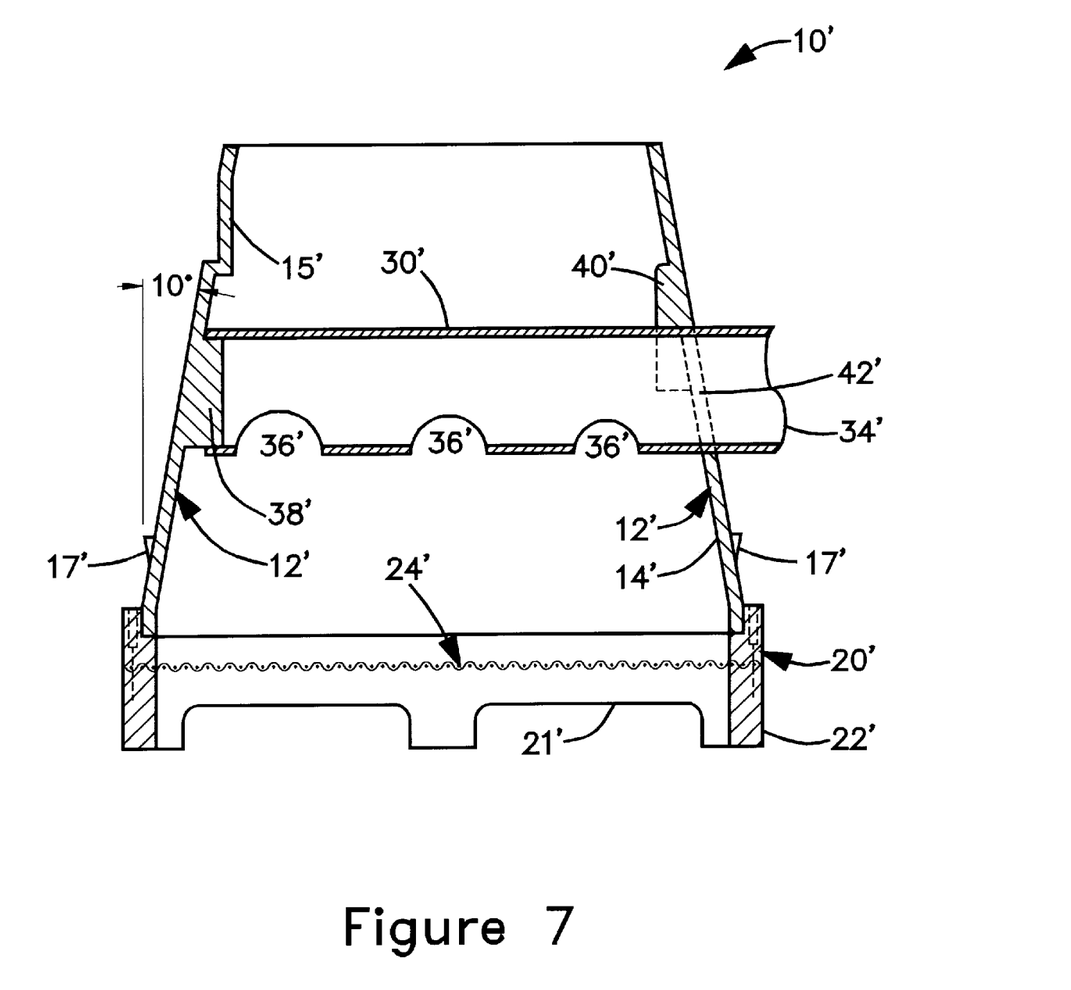
FIG. 7 is cross-sectional side-elevation view of an upweller in accordance with a second preferred embodiment of the present invention.
Figure 8:
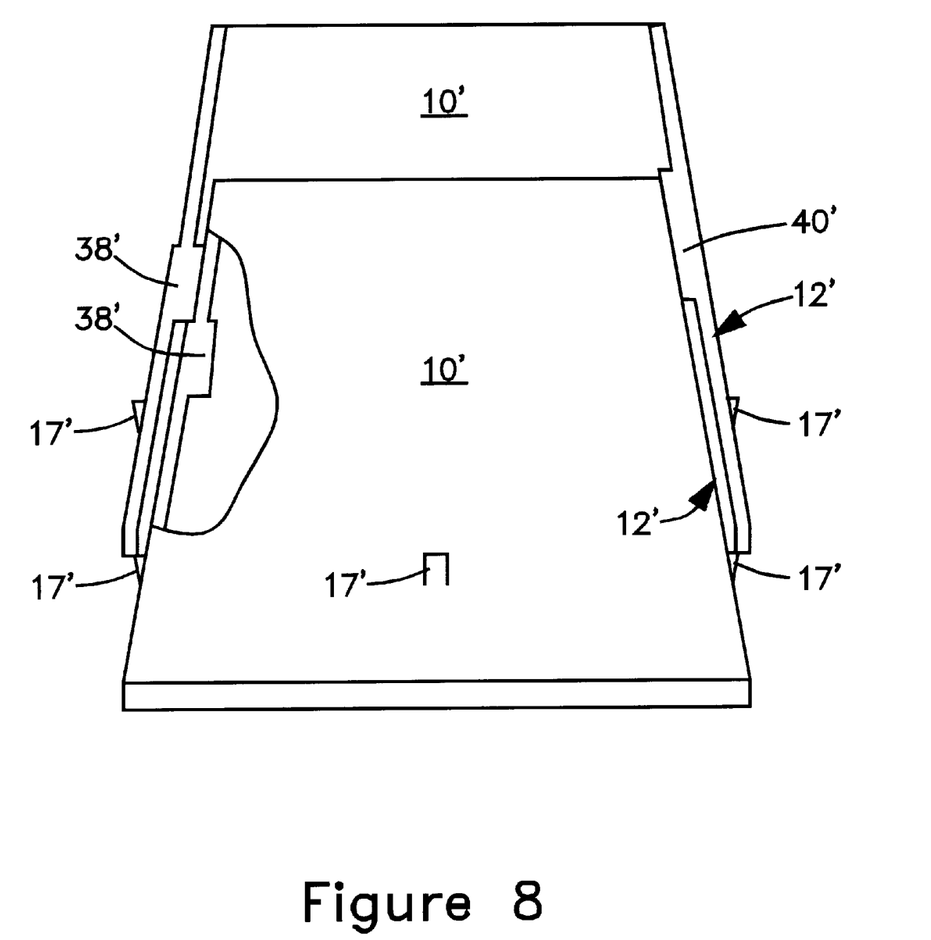
FIG. 8 is a partial cross-sectional and broken away side-elevation view of two upwellers of the type depicted in FIG. 7, the upwellers being nested together.

FIG. 7 depicts an inventive upweller in accordance with a second preferred embodiment of the present invention. The primary difference between this embodiment and the embodiment of FIGS. 1 and 2 resides in reinforcing member 40', the utilization of nesting tabs 17' and the structure of screen assembly 20'. It should be noted, however, that upweller 10' of FIG. 7 is particularly well-suited for use in land-based aquaculture systems due to the scalloped structure of rim 22' of screen assembly 20'. This scalloped structure permits liquid to flow freely below silo 12' even when upweller 10' stands at the bottom of an aquaculture tank. As shown in FIG. 7, rim 22' essentially consists of an upper component and a lower component which sandwich liquid permeable member 24' therebetween. The components of rim 22' are secured together with a fastener so that permeable member 24' is held taut therebetween. The lower portion of silo 12' is affixed to the upper portion of rim 22', preferably with a fastener of the type described above. It will be appreciated that upweller 10' does not have a reinforcing portion along the bottom edge of silo 12' as does upweller 10. Other structures identified in FIGS. 7 and 8 by numerals 15', 30', 34', 36' and 38', correspond in function to structures identified in one or more of FIGS. 1–6 by a corresponding unprimed numeral.

Figure 9:
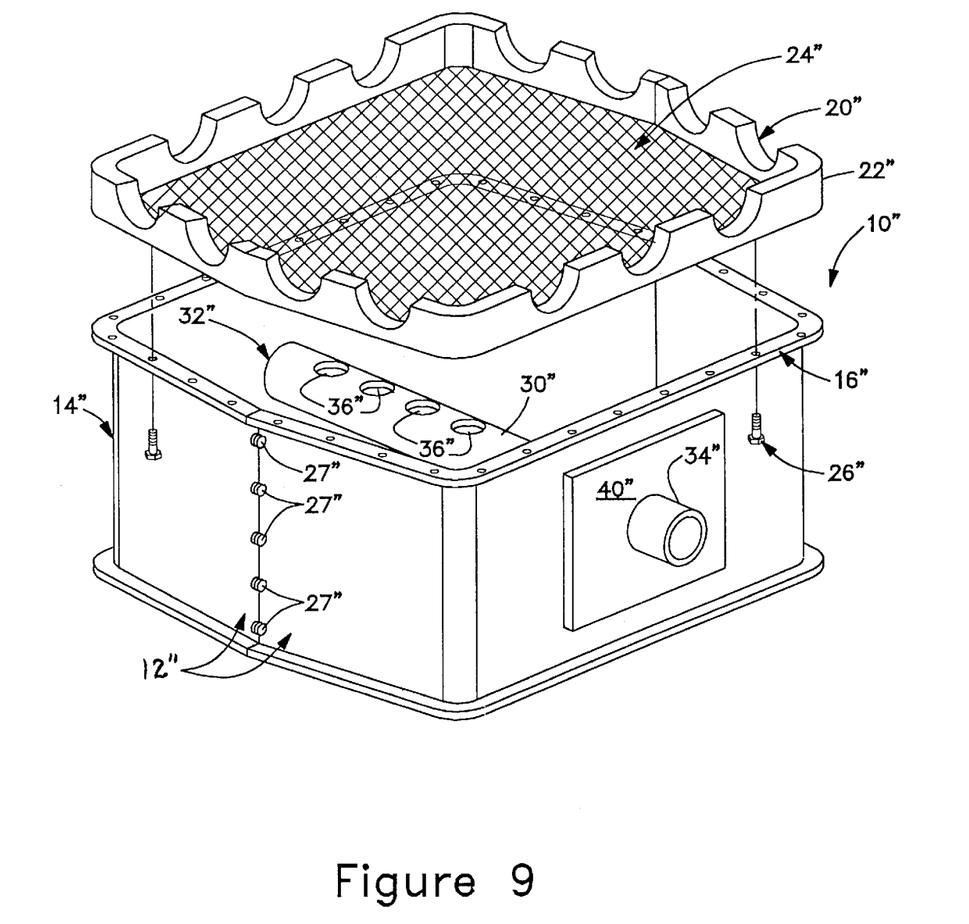
FIG. 9 is a partially exploded perspective view of the underside of an upweller in accordance with a third preferred embodiment of the present invention.

Still another preferred embodiment of the present invention is shown in FIG. 9 as a partially exploded perspective view of the underside of upweller 10". The primary distinction between upweller 10" on the one hand and upwellers 10 and 10' on the other is that while upwellers 10 and 10' utilize integral fully-formed silos, upweller 10" utilizes a two-component silo 12" which, when assembled, is generally hexagonal in cross-section. Each component of silo 12" is generally U-shaped and these components are assembled utilizing fasteners 27" along opposite sides thereof. When exhaust port 30" and screen assembly 20" are removed from silo 12", silo 12" can be disassembled and nested together such that one component thereof is inverted and mates with the other for compact storage. Naturally, when a plurality of upwellers 10" are utilized, the disassembled components of the silos can continue to be stacked in a most efficient manner.

It will be appreciated that screen assembly 20" is of the same general configuration as that of screen assembly 20'. Also, upweller 10" is particularly well-suited for use in aquaculture tanks due to the scalloping of rim 22". When in use, screen assembly 20" is affixed to silo 12" along the bottom edge 16" thereof via fasteners 26". In this embodiment of the present invention, walls 14" of silo 12" do not taper from the bottom toward the top of silo 12". Instead, upweller 10" derives its compact storage characteristics from its ability to be disassembled such that one component can be inverted and received within another. Naturally, all of screen assemblies 20, 20' and 20" can utilize permeable members of different pore sizes. Thus, by interchanging different screen assemblies, upwellers 10, 10' and 10" can all selectively and individually receive a number of different screen assemblies. Other structures identified by numerals 32", 36" and 40" in FIG. 9, correspond in function to structures identified in one or more of FIGS. 1–6 by a corresponding unprimed numeral.

While the present invention as been described in connection with what is presently considered to be the most practical and preferred embodiments, it is to be understood that the invention is not limited to the disclosed embodiments, but is intended to cover the various modifications and equivalent arrangements included within the spirit and scope of the appended claims.

I claim:

1. A portable shellfish aquaculture upweller for growing shellfish seed in a body of liquid during the nursery phase of the shellfish life cycle, comprising:

a silo having a top end, a bottom end, and a liquid impermeable sidewall which together define a silo volume which decreases in cross-section between said ends, said sidewall having an aperture extending therethrough and said bottom end defining an aperture such that when said upweller is in an upright use position in said body of liquid said silo is partially submerged in the liquid wherein said top end extends above the liquid and said sidewall aperture and said bottom end aperture are at least partially disposed within the liquid;

a selectively mountable exhaust port, extending through said aperture in the sidewall and having entry and exit regions to thereby provide liquid communication from said aperture in the bottom end, through said volume to said port entry region and out said port exit region when said upweller is in use; and a selectively mountable and liquid permeable assembly which closely conforms in shape with and covers said aperture in the bottom end when said assembly is mounted to said silo, said assembly having a substantially flat support permitting the liquid to pass therethrough while retaining the shellfish seed thereon when said upweller is in use.

2. The upweller of claim 1, wherein said silo has four sides which define a volume having a generally rectangular cross-section; and said silo decreases in cross-section from said bottom end toward said top end.

3. The upweller of claim 1, wherein said silo has four sides which define a volume having a generally square cross-section and wherein said silo decreases in cross-section from said bottom end toward said top end.

4. The upweller of claim 1, wherein said silo further comprises a port-support within the silo-defined volume at a location therein which is generally opposite to said side-wall aperture;

said exhaust port extends through said sidewall aperture and mates with said port support; and said port-entry region comprises at least one aperture which is disposed along an intermediate length of said exhaust port and within said silo volume when said exhaust port is installed in said silo.

5. The upweller of claim 1, wherein said liquid permeable assembly is a screen assembly which comprises a liquid-permeable member, a rigid rim surrounding said liquid-permeable member, and at least one fastener for detachably affixing said rim of said screen assembly to said bottom end of said silo.

6. The upweller of claim 5, wherein said silo comprises two generally U-shaped components which can be assembled to form a silo having six sides and a generally hexagonal cross-section which is constant from said bottom end toward said top end.

7. The upweller of claim 1, wherein said liquid permeable assembly is a screen assembly which comprises a screen member, a rigid rim surrounding said screen member and means for detachably affixing said screen assembly to said silo.

8. The upweller of claim 7, wherein said rim extends from said screen member in a direction away from the top end of the silo, in a scalloped shape extending around and projecting from the bottom end of the silo.

9. The upweller of claim 1, wherein said exhaust port further comprises means for selectively varying the rate of fluid flow through said exhaust port entry region.

10. A portable shellfish aquaculture upweller for growing shellfish seed with controlled exposure to a liquid ambient environment comprising:

impermeable wall means for defining a partially enclosed volume and for receiving the shellfish seed, said wall means defining upper and lower ends and having a substantially continuously varying cross-section from said lower end toward said upper end;

removable port means for permitting fluid communication between said partially enclosed volume and the liquid ambient environment when said port means is installed in said silo means and when said upweller is in use;

seed-support means for retaining the shellfish seed within said partially enclosed volume and for permitting fluid communication between said partially enclosed volume and the ambient environment, said seed-support means being disposed at said lower end of said silo when said seed-support means is attached thereto;

means for removably affixing said port means to said silo means; and means for removably affixing said seed-support means to said wall means.

11. The upweller of claim 10, wherein said silo is a generally truncated pyramid.

12. The upweller of claim 10, wherein said silo further comprises nesting tabs.

13. The upweller of claim 10, wherein said port includes means for permitting evenly distributed fluid flow through said partially enclosed volume.

14. The upweller of claim 10, wherein the cross-section of the wall means decreases from said lower end toward said upper end.

15. The upweller of claim 14, wherein the wall means tapers inwardly at an angle of about 10°.

16. The upweller of claim 14, wherein the silo has a height between the upper and lower ends of about 24 inches and the decrease in cross-section is between about two and six inches.

17. A shellfish aquaculture upweller for growing shellfish seed in a body of liquid during the nursery phase of the shellfish life cycle, comprising:

a silo having a top end, a bottom end, and a side wall which together define a silo volume, said side wall having an aperture extending therethrough, said bottom end defining an aperture such that when said upweller is in an upright use position in said body of liquid said silo is partially submerged in the liquid wherein said top end extends above the liquid and said side wall aperture and said bottom end aperture are at least partially disposed within the liquid;

a selectively mountable exhaust port, extending through said aperture in the side wall and having entry and exit regions to thereby provide liquid communication from said aperture in the bottom end, through said volume to said port entry region and out said port exit region when said upweller is in use;

a selectively mountable and liquid permeable assembly which covers said aperture in the bottom end when said assembly is mounted to said silo, said assembly permitting the liquid to pass therethrough while retaining the shellfish seed in the silo volume when said upweller is in use;

a port-support within the silo at a location therein which is generally opposite to said aperture in the side wall; wherein said exhaust port extends through said aperture in the side wall and mates with said port support; and said port entry region comprises at least one aperture which is disposed along an intermediate length of said exhaust port and within said silo volume when said exhaust port is installed in said silo.

18. The upweller of claim 17, wherein said port entry region comprises a plurality of apertures of varying size and shape whereby fluid flow through said volume is evenly distributed.

* * * * *